United States Patent [19]

Stearns

[11] Patent Number: 5,272,343
[45] Date of Patent: Dec. 21, 1993

[54] SORTER FOR COINCIDENCE TIMING CALIBRATION IN A PET SCANNER

[75] Inventor: Charles W. Stearns, Milwaukee, Wis.

[73] Assignee: General Electric Company, Milwaukee, Wis.

[21] Appl. No.: 920,350

[22] Filed: Jul. 27, 1992

[51] Int. Cl.$^5$ .............................................. G01T 1/166
[52] U.S. Cl. ........................... 250/363.03; 250/363.04; 250/363.09
[58] Field of Search ...................... 250/363.09, 363.03, 250/363.04, 369, 252.1 R

[56] References Cited

FOREIGN PATENT DOCUMENTS

| 35170 | 2/1984 | Japan | 250/363.09 |
| 99377 | 6/1984 | Japan | 250/363.09 |

OTHER PUBLICATIONS

Jones et al, "A VMEbus Based, Real Time Sorter Design for Positron Emission Tomography", IEEE Trans. Nucl. Sci, 33(1), Feb. 1986, pp. 601–604.

*Primary Examiner*—Carolyn E. Fields
*Attorney, Agent, or Firm*—Quarles & Brady

[57] ABSTRACT

A PET scanner includes an orbiting source of positron emissions which is employed in an attenuation scan to collect attenuation data used to correct image data acquired during an emission scan. In addition, the orbiting source is used in a coincidence timing calibration scan to acquire timing information employed to calibrate the scanner electronics. Time-of-flight errors in the calibration timing information due to the use of an off-center emissions source are eliminated by a sorter which separates the timing data as a function of the position of the orbiting source.

4 Claims, 4 Drawing Sheets

SORTER FOR COINCIDENCE TIMING CALIBRATION IN A PET SCANNER

BACKGROUND OF THE INVENTION

The field of the invention is positron emission tomography (PET) scanners, and particularly the calibration of such scanners.

Positrons are positively charged electrons which are emitted by radionuclides that have been prepared using a cyclotron or other device. The radionuclides most often employed in diagnostic imaging are fluorine-18 ($^{18}F$), carbon-11 ($^{11}C$), nitrogen-13 ($^{13}N$), and oxygen-15 ($^{15}O$). These are employed as radioactive tracers called "radiopharmaceuticals" by incorporating them into substances, such as glucose or carbon dioxide. The radiopharmaceuticals are injected in the patient and become involved in such processes as glucose metabolism, fatty acid metabolism and protein synthesis.

As the radionuclides decay, they emit positrons. The positrons travel a very short distance before they encounter an electron, and when this occurs, they are annihilated and converted into two photons, or gamma rays. This annihilation event is characterized by two features which are pertinent to PET scanners—each gamma ray has an energy of 511 keV and the two gamma rays are directed in substantially opposite directions. An image is created by determining the number of such annihilation events at each location within the field of view.

The PET scanner includes one or more rings of detectors which encircle the patient and which convert the energy of each 511 keV photon into a flash of light that is sensed by a photomultiplier tube (PMT). Coincidence detection circuits connect to the detectors and record only those photons which are detected simultaneously by two detectors located on opposite sides of the patient. The number of such simultaneous events indicates the number of positron annihilations that occurred along a line joining the two opposing detectors. Within a few minutes hundreds of thousands of events are recorded to indicate the number of annihilations along lines joining pairs of detectors in the ring. These numbers are employed to reconstruct an image using well known computed tomography techniques.

One of the vital calibration operations in a PET scanner is the coincidence timing calibration. The purpose of this calibration is to correct for relative timing differences in the detection modules and the "front end" electronics of the PET scanner. This calibration is traditionally performed by placing a source of positrons at the center of the detector rings and measuring the time difference between the signals which record coincidence events. Since the photons travel an equal distance to the two detectors which record a coincidence event, their signals should indicate an event at precisely the same moment. Any difference in time, therefore, represents an error caused by differences in the detectors, PMTs or electronic circuits. These differences can be offset by introducing appropriate delays in the electronics.

Another measurement which is made to correct errors introduced into the data during an emission scan of a patient is referred to as an attenuation measurement. As described by R. H. Huesman, et al. in "Orbiting Transmission Source For Positron Tomography", *IEEE Transactions on Nuclear Science*, Vol. 35, No. 1, February 1988, such measurements are made by orbiting a positron source around the opening formed by the detector ring and counting the number of detected coincidence events both when the patient is in place and when the patient is removed. Indeed, as described by C. J. Thompson, et al. in "Simultaneous Transmission And Emission Scans In Positron Emission Tomography", *IEEE Transactions on Nuclear Science*, Vol. 36, No. 1, February 1989, such a measurement can be made while the normal emission scan is being conducted. Since the orbiting source is always very close to one of the two detectors that record a coincidence event, there is a fixed time difference between the detection of the two photons ($\approx 2.2$ nanoseconds). This "time-of-flight" difference has precluded the use of the orbiting source as a means for making the coincidence timing calibration.

SUMMARY OF THE INVENTION

The present invention is a sorter for a positron emission tomographic scanner which receives coincidence data packets containing timing data obtained from an orbiting source, which receives a signal indicative of the source's position in its orbit, and which stores the timing information in one of two sinogram calibration arrays. More particularly, the sorter includes a filter for filtering out timing data which is not produced as a result of emissions from the orbiting source and selection means for conveying the unfiltered timing data to one of the two sinogram calibration arrays, the selection being determined by the location of the orbiting source when the emission occurred.

A general object of the invention is to provide coincidence timing calibration data from an orbiting source. Because of the time-of-flight difference in the calibration data acquired from the orbiting source when it is on opposite sides of its orbit, the present invention sorts the data into two separate calibration arrays such that each array stores data with the same time-of-flight error. As a result, the timing calibration data in each array can be easily corrected and combined with corrected timing calibration data from the other array before it is used to calibrate the PET scanner.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENTS

Figure 1:
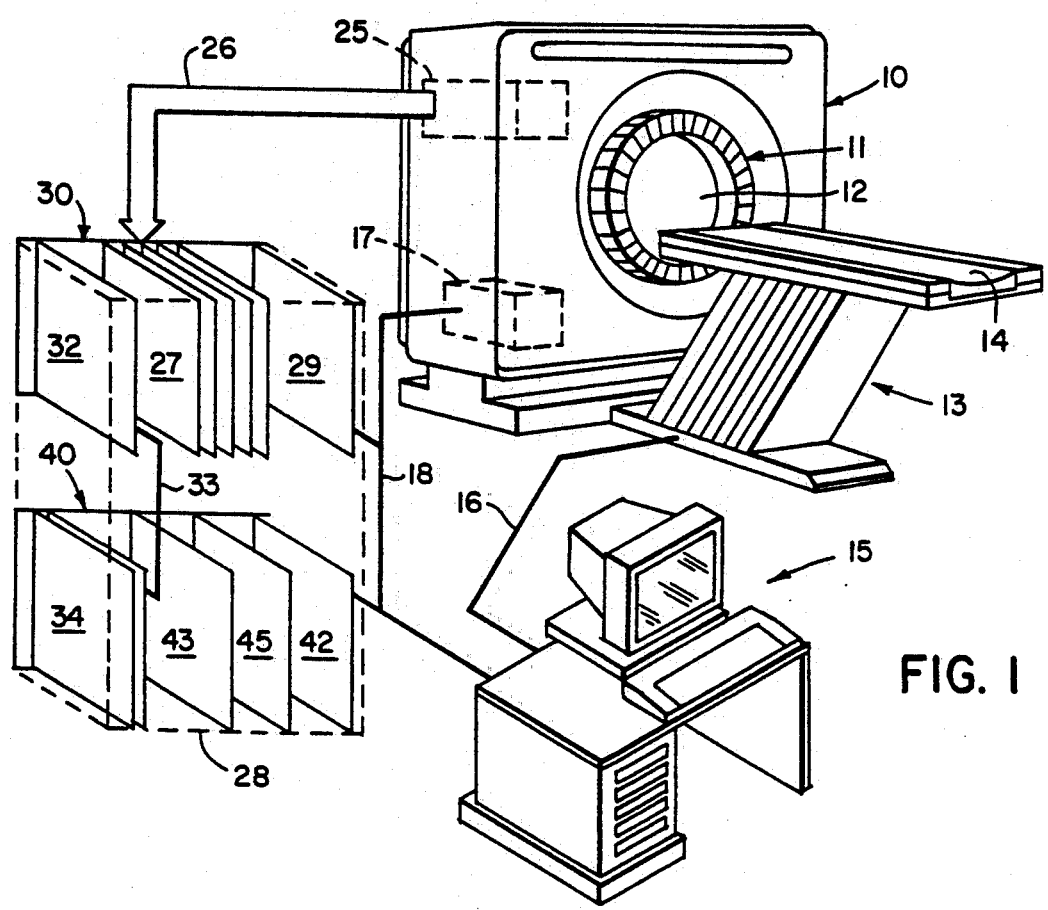
FIG. 1 is a pictorial view with parts cut away of a PET scanner system which employs the present invention.

Referring particularly to FIG. 1, the PET scanner system includes a gantry 10 which supports a detector ring assembly 11 about a central opening, or bore 12. A patient table 13 is positioned in front of the gantry 10 and is aligned with the central axis of the bore 12. A patient table controller (not shown) moves the table bed 14 into the bore 12 in response to commands received from an operator work station 15 through a serial communications link 16. A gantry controller 17 is mounted within the gantry 10 and is responsive to commands received from the operator work station 15 through a second serial communication link 18 to operate the gantry. For example, the gantry can be tilted away from vertical on command from the operator, it can perform a "transmission scan" with a calibrated radionuclide source to acquire attenuation measurements, it can perform a "coincidence timing calibration scan" to acquire corrective data, or it can perform a normal "emission scan" in which positron annihilation events are counted.

Figure 2:
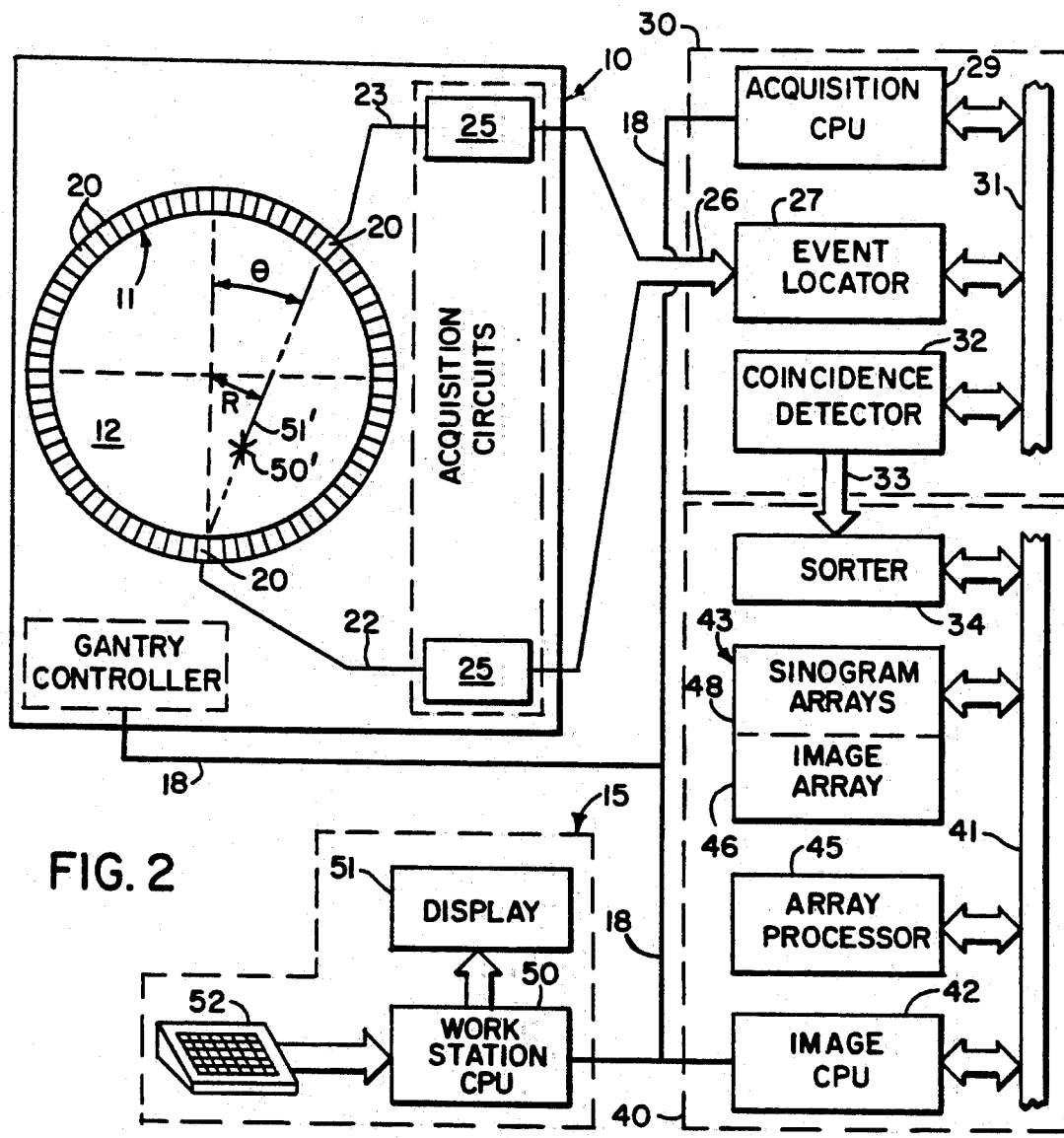
FIG. 2 is a schematic diagram of the PET scanner system of FIG. 1.
Figure 3:
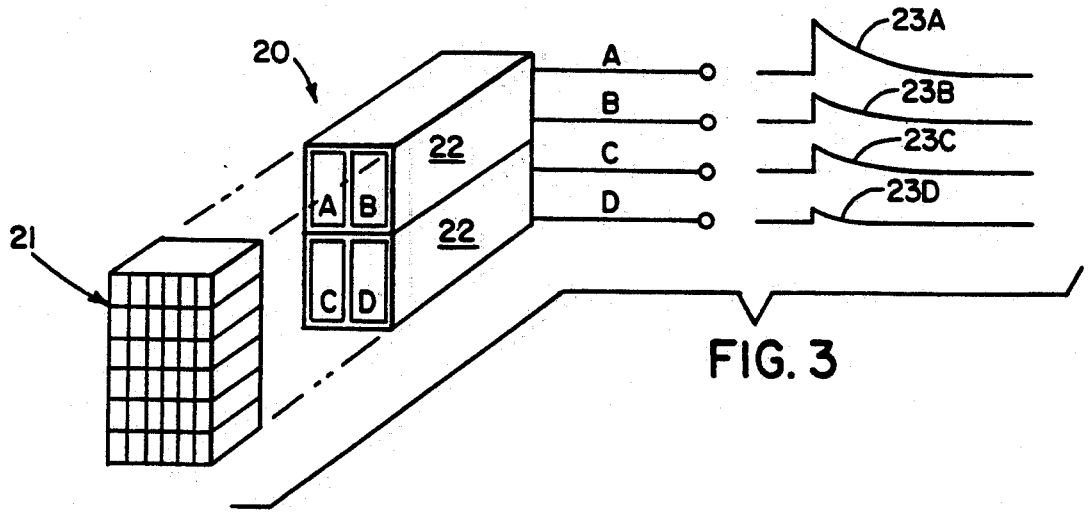
FIG. 3 is a pictorial view of a detector module which forms part of the PET scanner system of FIG. 1.

As shown best in FIGS. 2 and 3, the detector ring 11 is comprised of 56 detector blocks 20. Each block 20 includes a set of bismuth germanate scintillator crystals 21 (abbreviated BGO) arranged in a 6×6 matrix and disposed in front of four photomultiplier tubes 22 (abbreviated PMT). Each PMT 22 produces an analog signal 23A-23D which rises sharply when a scintillation event occurs then tails off exponentially with a time constant of 300 nanoseconds. The relative magnitudes of the analog signals 23A-23D is determined by the position in the 6×6 BGO matrix at which the scintillation event took place, and the total magnitude of these signals is determined by the energy of the gamma ray which caused the event.

A set of acquisition circuits 25 are mounted within the gantry 10 to receive the four signals 23A-23D from each of the modules 20 in the detector ring 11. The acquisition circuits 25 determine the event coordinates within the block of BGO crystals 21 by comparing the relative signal strengths as follows:

$$x=(A+C)/(A+B+C+D); \quad (1)$$

$$z=(A+B)/(A+B+C+D). \quad (2)$$

These coordinates (x,z), along with the sum of all four signals (A+B+C+D) are then digitized and sent through a cable 26 to an event locater circuit 27 housed in a separate cabinet 28. Each acquisition circuit 25 also produces an event detection pulse (EDP) which indicates the exact moment the scintillation event took place.

Referring particularly to FIGS. 1 and 2, the event locator circuits 27 form part of a data acquisition processor 30 which periodically samples the signals produced by the acquisition circuits 25. The processor 30 has a backplane bus structure 31 which conforms with the VME standard, and an acquisition CPU 29 which controls communications on this bus 31 and links the processor 30 to the local area network 18. The event locator 27 is comprised of a set of separate circuit boards which each connect to the cable 26 and receive signals from corresponding acquisition circuits 25 in the gantry 10. The event locator 27 synchronizes the event with the operation of the processor 30 by detecting the event pulse (EDP) produced by an acquisition circuit 25, and converting it into an 8-bit time marker which indicates when within the current 250 nanosecond sample period the scintillation event took place. Also, this circuit 27 discards any detected events if the total energy of the scintillation is outside the range of 511 keV±20%. During each 250 nanosecond sample period, the information regarding each valid event is assembled into a set of digital numbers that indicate precisely when the event took place and the position of the BGO crystal 21 which detected the event. This event data packet is conveyed to a coincidence detector 32 which is also part of the data acquisition processor 30.

The coincidence detector 32 accepts the event data packets from the event locators 27 and determines if any two of them are in coincidence. Coincidence is determined by a number of factors. First, the time markers in each event data packet must be within 12.5 nanoseconds of each other, and second, the locations indicated by the two event data packets must lie on a straight line which passes through the field of view (FOV) in the scanner bore 12. Events which cannot be paired are discarded, but coincident event pairs are located and recorded as a coincidence data packet that is conveyed through a serial link 33 to a sorter 34. Each coincidence data packet includes a pair of digital numbers which precisely identify the addresses of the two BGO crystals 21 that detected the event. For a more detailed description of the coincidence detection 32, reference is made to co-pending U.S. patent application Ser. No. 07/919,456, which was filed on even date herewith and is entitled "Coincidence Detector For A PET Scanner" which is incorporated herein by reference.

The sorter 34 is a circuit which forms part of an image reconstruction processor 40. The image reconstruction processor 40 is formed about a backplane bus 41 that conforms to the VME standards. An image CPU 42 controls the backplane bus 41 and it links the processor 40 to the local area network 18. A memory module 43 also connects to the backplane 41 and it stores the data used to reconstruct images as will be described in more detail below. An array processor 45 also connects to the backplane 41 and it operates under the direction of the image CPU 42 to perform the image reconstruction using the data in memory module 43. The resulting image array 46 is stored in memory module 43 and is output by the image CPU 42 to the operator work station 15.

The function of the sorter 34 is to receive the coincidence data packets and generate from them memory addresses for the efficient storage of the coincidence data. The set of all projection rays that point in the same direction (θ) and pass through the scanner's field of view is a complete projection, or "view". The distance (R) between a particular projection ray and the center of the field of view locates that projection ray within the view. As shown in FIG. 2, for example, an event 50' occurs along a projection ray 51' which is located in a view at the projection angle θ and the distance R. The sorter 34 counts all of the events that occur on this projection ray (R,θ) during the scan by sorting out the coincidence data packets that indicate an event at the two BGO detector crystals lying on this projection ray. During an emission scan, the coincidence counts are organized in memory 43 as a set of two-dimensional arrays, one for each axial image, and each having as one of its dimensions the projection angle θ and the other dimension the distance R. This $\theta$ by R map of the measured events is called a histogram, or more commonly the sinogram array 48.

Coincidence events occur at random and the sorter 34 quickly determines the $\theta$ and R values from the two crystal addresses in each coincidence data packet and increments the count of the corresponding sinogram array element. The values of $\theta$ and R may be calculated as follows, although in the preferred embodiment these are converted to memory addresses as will be described in detail below.

$$\theta = (\phi_2 + \phi_1)/2 + 90° \qquad (3)$$

$$R = r_0 \cos[(\phi_2 - \phi_1)/2] \qquad (4)$$

where
$\phi_1$ = angular orientation of first detector crystal;
$\phi_2$ = angular orientation of second detector crystal; and
$r_0$ = radius of detector ring.

At the completion of the emission scan, the sinogram array 48 stores the total number of annihilation events which occurred along each ray $R_1O$.

The array processor 45 reconstructs an image from the data in the sinogram array 48. First, however, a number of corrections are made to the acquired data to correct for measurement errors such as those caused by attenuation of the gamma rays by the patient, detector gain nonuniformities, random coincidences, and integrator deadtime. Each row of the corrected sinogram array is then Fourier transformed by the array processor 45 and multiplied by a one-dimensional filter array. The filtered data is then inverse Fourier transformed, and each array element is backprojected to form the image array 46. The image CPU 42 may either store the image array data on disk or tape (not shown) or output it to the operator work station 15.

The operator work station 15 includes a CPU 50, a CRT display 51 and a keyboard 52. The CPU 50 connects to the local area network 18 and it scans the keyboard 52 for input information. Through the keyboard 52 and associated control panel switches, the operator can control the calibration of the PET scanner, its configuration, and the positioning of the patient table for a scan. For example, the operator can download to the sorter 34 through the local area network 18 configuration data and data which indicates whether the scanner is performing an emission scan, an attenuation scan, or a coincidence calibration timing scan. Similarly, the operator can control the display of the resulting image on the CRT display 51 and perform image enhancement functions using programs executed by the work station CPU 50.

Figure 4:
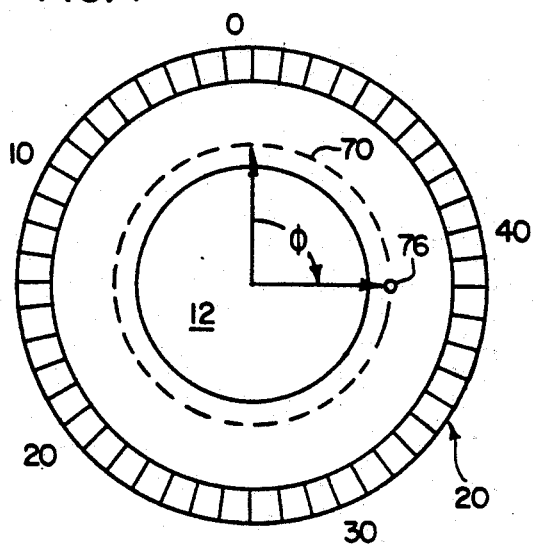
FIG. 4 is a schematic representation of the orbiting calibration source which forms part of the PET scanner system of FIG. 1.

Referring particularly to FIGS. 1 and 4, the fifty-six detector modules 20 are numbered from zero to fifty-five, starting at the top of the central bore 12 and extending around it in the counter-clockwise direction. Located radially inward from the detector ring 20 is a circular track indicated by the dotted line 70, about which a radioactive rod source 76 is orbited during an attenuation scan and during a coincidence timing calibration scan. The rod source 76 moves in the clockwise direction at twenty revolutions per minute, and its location at any moment is indicated by the angle $\phi$. As will be described in more detail below with respect to FIG. 5, an incremental position encoder 77 is coupled to the stepping motor which rotates the rod source 76 about the path 70, and its signal is input to the sorter 34 to indicate the position of the rod source 76.

Figure 5:
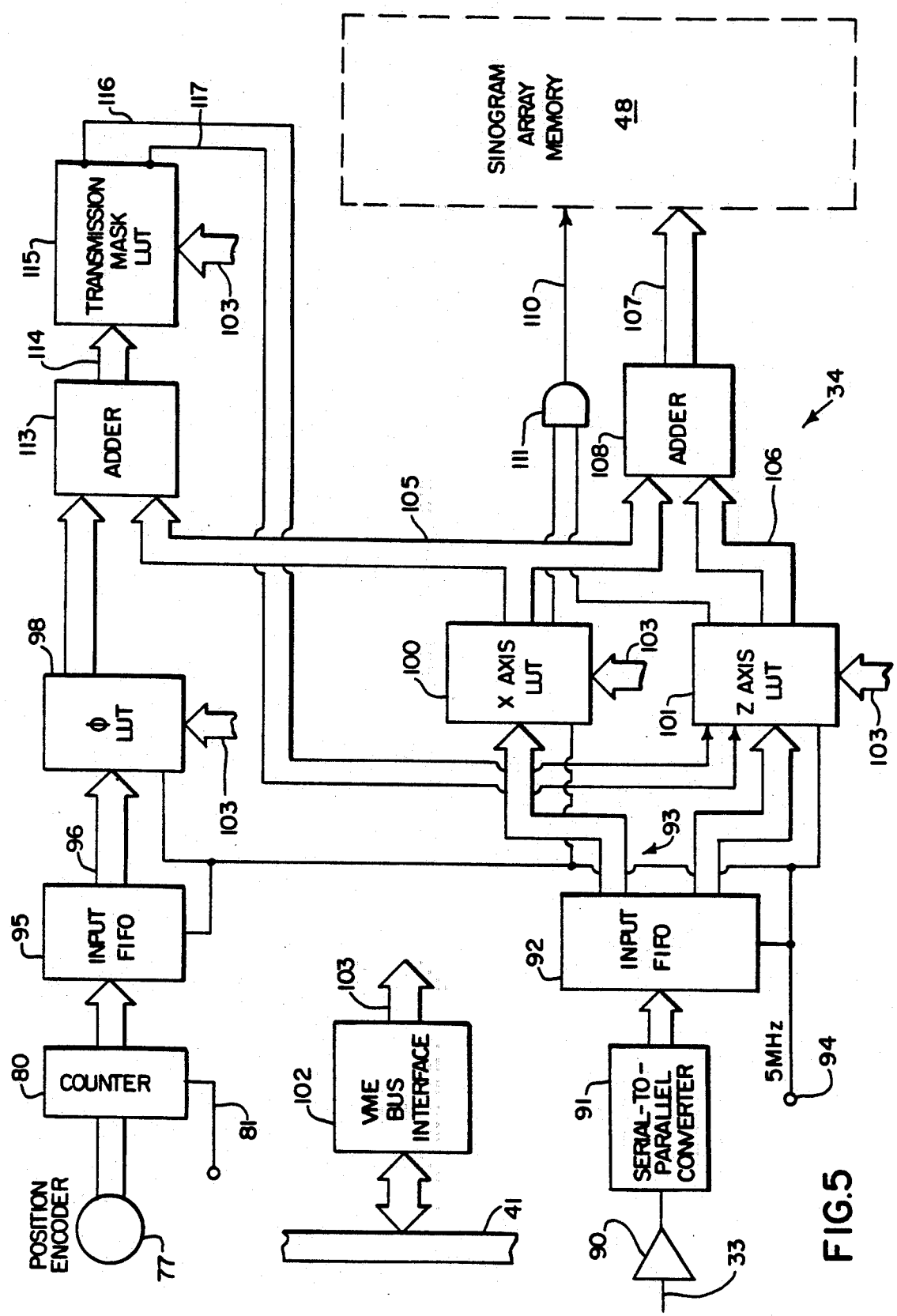
FIG. 5 is a block diagram of the sorter which forms part of the PET scanner of FIG. 2.

Referring particularly to FIG. 5, the signal from the position encoder 77 is received by a binary counter 80 in the sorter 34. The counter 80 is reset through line 81 each time the rod source 76 passes through its home position at the top of the bore 12, and it is incremented one count for each pulse received from the position encoder 77.

Also input to the sorter 34 is the coincidence data packet produced by the coincidence detector and transmitted serially through the serial link 33. During a normal emission scan this data packet has the format shown in Table A.

TABLE A

| Bit | Description |
|---|---|
| 0-4 | z position in crystal array |
| 5-14 | x position in crystal array first detector module ring location |
| 15-19 | z position in crystal array |
| 20-29 | x position in crystal array second detector module ring location |
| 30 | random event bit |
| 31 | event class |

Figure 6:
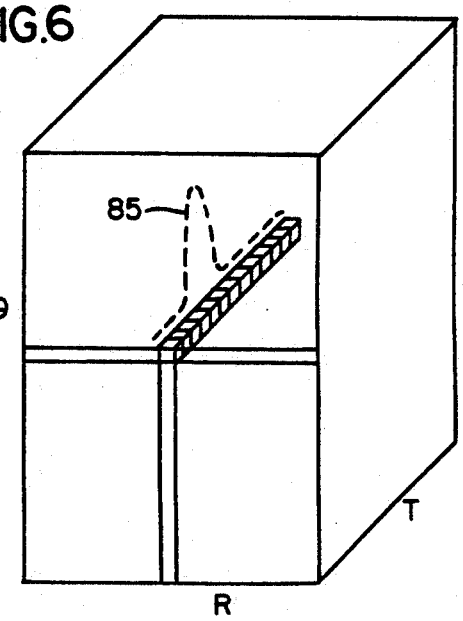
FIG. 6 is a graphic representation of a sinogram calibration array which is produced by the sorter of FIG. 5.

However, during a coincidence timing calibration scan the three least significant bits in each x position field are replaced by three bits of timing data by the coincidence detector 32. This 6-bit timing field indicates the measured time difference between the detection of the two photons in the coincidence event. The function of the sorter 34 is to determine if the received coincidence data packet resulted from emissions of the source 76, and if so, to record the time difference information in a three-dimensional sinogram correction array stored in the memory 48. One such sinogram correction array is depicted schematically in FIG. 6 and includes the conventional $\theta$ and R dimensions which indicate the projection angle and ray position respectively of the coincidence event. The third dimension in this array, however, indicates the timing value which may range from $-31$ to $+32$ (i.e. 6-bits). Each of the sixty four "bins" along this timing dimension (T) represents one of the possible measured timing values, and each bin stores a total count of the number of coincidence events produced by the source 76 along the ray $\theta$, R with the particular time difference value. As a result, at the completion of the coincidence timing calibration scan, a histogram of the timing values can be reconstructed for each ray $\theta$,R as indicated by the dotted line 85. These histograms may be employed to calibrate the acquisition circuits 25 in the gantry 10.

An important aspect of the present invention is the recognition that an accurate calibration of coincidence timing cannot be achieved by counting all the coincidence timing values in a single three-dimensional calibration array. Referring again to FIG. 4, when the source 76 produces a coincidence event while in the position shown, one photon will clearly reach the detector 20 located radially outward therefrom much sooner ($\approx 2.2$ nanoseconds) than the other photon will strike a detector 20 on the opposite side of the ring. Conversely, when an annihilation event occurs along the same ray ($\theta$,R) with the source 76 located on the opposite side of the bore 12, the same time-of-flight difference will be introduced into the 6-bit timing data, but its sign will be reversed. As a result, the timing calibration histogram for that ray will be blurred if both measurements are recorded in one array. As will now be described, the sorter 34 uses the source position information in the counter 80 to separate the calibration timing data into two calibration arrays such that the histogram in each will not be blurred by the time-of-flight difference.

Referring particularly to FIG. 5, the coincidence data packet on the serial link 33 is input to a receiver 90 and transformed from a serial bit stream to parallel form by converter 91. These data packets are then loaded into an input FIFO memory 92 which buffers the incoming data and presents each coincidence data packet at a set of outputs 93 in synchronism with a 5 MHz system clock 9. A similar input FIFO memory 95 connects to the output of counter 80 and buffers the readings therefrom such that the correct source position data is output at 96 in synchronism with corresponding coincidence data on outputs 93.

The input data is applied to one of three look up table (LUT) circuits 98, 100 or 101 which convert the data into components of a sinogram memory address. The LUTs 98, 100 and 101 are memories in which input data is applied to their address terminals and the data on the addressed memory line is read out as the output data. The memories can be configured through a VME bus interface circuit 102 and module bus 103 with data which provides the correct conversion for the scan being performed.

The x-axis LUT 100 implements equations (3) and (4) above and produces an address component $(N_R + WN_\theta)$ on a bus 105. $N_R$ is the computed ray number, $N_\theta$ is the computed view number, and W is the maximum number of rays in one view (i.e. the sinogram width). This address component $(N_R + WN_\theta)$ identifies memory locations for coincidence events occurring on the ray $(R,\theta)$ and it is determined by the detector module numbers and x position numbers in the coincidence data packet.

The z-axis LUT 101 employs the z-axis information in the coincidence data packet to produce a memory address component $(WLN_z)$ on bus 106 which selects a sinogram array that corresponds to one of 35 separate slices. $N_z$ is the computed slice number, and L is the maximum number of views possible in the scan (i.e. the sinogram length).

During a conventional emissions scan of a patient, only the x-axis LUT 100 and the z-axis LUT 101 are employed by the sorter 34 to produce "V" sinograms, each having W columns and L rows. A single memory address $(N_R + WN_\theta + WLN_z)$ is produced on a bus 107 by an adder 108 which receives the two address components on busses 105 and 106. This memory address is applied directly to the sinogram array memory 48, but the count at that address is not incremented unless a valid data signal is also produced on a control line 110. The control line 110 is driven by an AND gate 111 which receives valid data output signals from both LUTs 100 and 101. If the coincidence event indicated in the data packet lies within the field of view of the sinograms being produced, valid data is indicated on line 110 and the sinogram memory location indicated on bus 107 is incremented one count.

When the scanner is operated in the coincidence timing calibration mode, the sorter 34 operates differently. The bits applied to the x-axis LUT 100 now include the timing difference information, and the memory address component $(N_T + TN_R + TWN_\theta)$ which it generates on bus 105 now includes the timing index $N_T$ and the number of timing indices T (equal to 71). This memory address component $(N_T + TN_R + TWN_\theta)$ is then added to the source position address component $(TWN_\phi)$ which is output by the $\phi$ LUT 98 and applied to ADDER 113. The resulting MASK address is applied through a bus 114 to the address inputs of a transmission mask LUT 115. As will be explained in more detail below, the transmission mask LUT is a 2-bit by 1M memory which produces a 2-bit output. One bit of this output indicates if the detected coincidence event was produced by the rotating source 76, and the other bit differentiates the two points on the orbit at which the source 76 could be located when it produced the annihilation event. The two bits are applied through control lines 116 and 117 to the z-axis LUT 101 where one controls the valid data bit produced on line 110 by AND gate 111, and the other is included in the z-axis memory address component $(WLTN_z)$. If the current coincidence data packet was not produced by the rotating source 76, the valid data bit is low and the event is not recorded in the sinogram array memory 48. And if it is a valid event, the second control line selects which of two sinogram correction arrays in the memory 48 will store the current event. That is, events which occur while the source 76 is in one portion of its orbit are stored in one sinogram correction array and events which occur while the source 76 is in the other portion of its orbit are stored in the other sinogram correction array. As explained above, by thus separating the recordation of coincidence timing values, the corruption of the measurements due to time-of-flight differences is eliminated.

Figure 7:
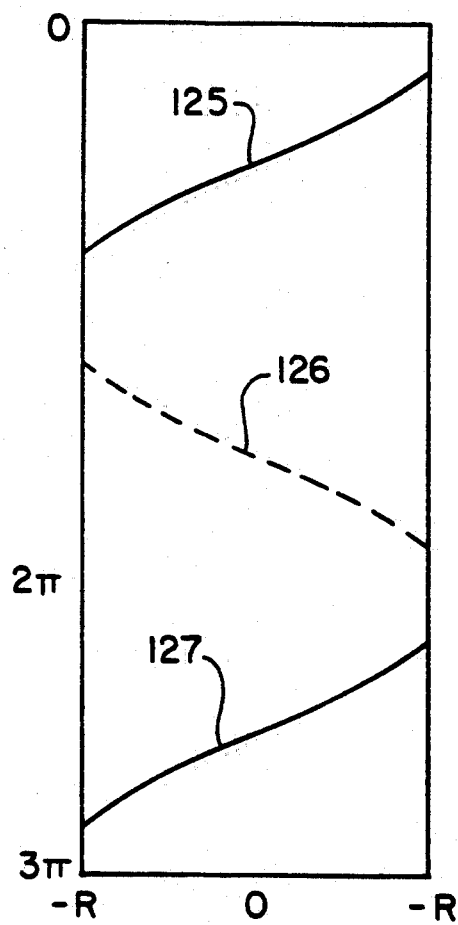
FIG. 7 is a graphic representation of a transmission mask which is employed by the sorter of FIG. 5.

The first goal of the transmission mask stored in the LUT 115 is to examine the coincidence event and source location and make an accept/reject decision based on whether the event's line of response passes through the orbiting source 76. The transmission mask is a two-dimensional sinogram array $(R,\theta)$ in which the locations where acceptance is proper store a "1" and locations which are unacceptable store a "0". In the above-cited Huesman, et al. article a method for calculating the bits in the transmission mask that should be set to "1" is described, and in the above-cited Thompson, et al. article a method for deriving the transmission mask from a sinogram produced by the orbiting source is described. Such a mask is shown schematically in FIG. 7, where the horizontal axis represents ray location (R) and the vertical axis represents the sum of the projection angle $\theta$ and the orbiting source angle $(\phi)$. The locations indicated by the three line segments 125, 126 and 127 are transmission mask locations in which the first of its bits are set to "1" to indicate an acceptable coincidence event. For those locations indicated by solid lines 125 and 127 the second mask bit is also set to "1" to indicate timing measurements made during one portion of the source orbit, and for the locations indicated by dotted line 126, the second mask bit is set to "0" to indicate timing measurements made during the other portion of the source orbit.

It should be apparent that many variation are possible from the preferred embodiment described herein without departing from the spirit of the invention. For example, additional rod sources may be used, in which case the transmission mask of FIG. 7 will have additional lines of acceptance that are shifted in phase from those shown. The same two bits can be used for both orbiting sources, or additional mask bits can be employed to construct separate sinogram correction arrays for each source. Also, two separate sinogram calibration arrays are produced in the preferred embodiment by using the transmission mask select bit to channel the count to one of the two separate arrays. It should be apparent that the same information could be stored in a single, larger array containing two rows of timing bins for each R,θ location. In such a data structure, the transmission mask select bit is employed to select one of the two rows of timing bins. In either case there are two sinogram calibration arrays, but they are organized differently in the memory.

I claim:

1. A positron emission tomographic scanner the combination comprising:

detector means having a plurality of detector modules disposed around a central opening and being operable to detect coincident photons produced in annihilation events within the central opening and produce coincidence data packets, each coincidence data packet including position data which indicates the locations of the two detector modules that detected the coincident photons and timing data which indicates the difference in time the coincident photons were detected by said two detector modules;

calibration means including a source which emits positrons to produce annihilation events and a means for moving the source within the central opening defined by said plurality of detector modules and for producing a position signal for indicating the location of the source;

memory means for storing calibration arrays which each store timing information derived from the timing data in said coincidence data packets; and a sorter connected to receive the coincidence data packets from the detector means, connected to receive the position signal from the calibration means, and connected to write timing information into said calibration arrays, the sorter including:

(a) filter means for receiving the position data in each coincidence data packet and the position signal from the calibration means and filtering out the timing data in each coincidence data packet which is not produced as a result of emissions from said source, and (b) selection means for receiving the position data in coincidence data packets and the position signal from the calibration means and in response thereto conveying the timing information from unfiltered coincidence data packets to one of said calibration arrays, the selection being determined by the indicated position of the source.

2. The positron emission tomographic scanner as recited in claim 1 in which the filter means includes a transmission mask look-up table which receives as an input an address produced by adding an address component produced from the position data in the coincidence data packet to a second address component produced from the position signal from the calibration means.

3. The positron emission tomographic scanner as recited in claim 2 in which said transmission mask look-up table also functions as said selection means in which it produces a one-bit output signal that directs said timing information to one of two calibration arrays.

4. The positron emission tomographic scanner as recited in claim 3 in which said transmission mask look-up table produces a second one-bit output signal in response to each input address, and the state of this second one-bit output signal determines if the timing data in the coincidence data packet is to be filtered out or conveyed to one of said calibration arrays.

* * * * *